United States Patent [19]

Clements et al.

[11] 4,212,357
[45] Jul. 15, 1980

[54] TURF AERATING DEVICE

[75] Inventors: Boyd D. Clements, Elmwood; Charles E. Hines; James J. Kubat, both of Lincoln, all of Nebr.

[73] Assignee: Outboard Marine Corporation, Waukegan, Ill.

[21] Appl. No.: 874,160

[22] Filed: Feb. 1, 1978

[51] Int. Cl.² .............................................. A01B 45/02
[52] U.S. Cl. ...................................... 172/22; 172/547
[58] Field of Search .............................. 172/21.22, 547

[56] References Cited

U.S. PATENT DOCUMENTS

| | | | |
|---|---|---|---|
| 166,156 | 7/1875 | Study | 172/547 |
| 342,758 | 5/1886 | Munday et al. | 172/547 |
| 2,700,926 | 2/1955 | Goit | 172/22 |
| 2,800,066 | 7/1957 | Cohrs et al. | 172/22 |
| 3,834,464 | 9/1974 | Carlson et al. | 172/22 |
| 4,148,362 | 4/1979 | Orth | 172/22 |

*Primary Examiner*—Paul E. Shapiro
*Attorney, Agent, or Firm*—Michael, Best & Friedrich

[57] ABSTRACT

Disclosed herein is a turf aerating device including a cylindrical drum rotatably supported from a frame for rolling travel over the surface of the turf to be aerated, a plurality of circumferentially-spaced, core-forming elements or tines mounted on the outer periphery of the drum in laterally-spaced, generally parallel rows, and a plurality of guard members mounted on the frame rearwardly of the drum axis. Each of the guard members extends toward the outer periphery of the drum to a location adjacent one of the rows of tines and has a surface located to travel closely adjacent the turf surface and thereby positively restrain the turf from being pulled upwardly by the tines as they are withdrawn from the turf after penetration. The guard members terminate in a generally straight edge closely spaced from the outer periphery of the drum so as to serve as a scraper from removing debris collecting on the drum.

9 Claims, 3 Drawing Figures

TURF AERATING DEVICE

BACKGROUND OF THE INVENTION

The invention relates to turf aerating devices and, more particularly, to turf aerating devices including one or more cylindrical drums carrying a plurality of core-forming elements or tines.

Turf aerating devices are commonly used for aerating golf course greens, fairways, and tees, playing fields, lawns and the like. One type of such devices includes one or more cylindrical members or drums carrying a plurality of core-forming elements or tines which penetrate through the turf to remove plugs or cores of grass and soil as the drum is rolled over the surface to be aerated. When aerating a wet or soggy turf, there is a tendency for the tines to pull up the surrounding turf and cause some tearing of the turf. Also, debris, such as grass, dirt, cores, etc., can collect on the outer periphery of the drum. A build-up of such debris can cause a reduction in the depth of penetration by the tines and/or produce a knobby turf-engaging surface which creates impressions or indentations in the turf as the drum rolls thereover.

The Cohrs et al U.S. Pat. No. 2,800,066, issued July 23, 1957, discloses a different type of aerating device including means for minimizing tearing of the turf by the core-forming tines. Attention is also directed to the Wade U.S. Pat. No. 2,509,463, issued May 30, 1950.

SUMMARY OF THE INVENTION

The invention provides a turf aerating device including a frame, a cylindrical drum supported from the frame for rolling travel over the surface of the turf to be aerated, a plurality of radially extending, core-forming elements arranged in a plurality of laterally spaced, generally parallel rows, carried on the outer periphery of the drum and adapted to penetrate the turf, and a plurality of guard members mounted rearwardly of the drum axis. Each of the guard members extends towards the outer periphery of the drum to a location laterally adjacent one of the rows of tines and has a surface which is located to travel closely adjacent the turf surface and thereby restrain the turf from being pulled upwardly by the tines.

In one embodiment, each of the guard members terminates in an inner edge closely spaced from the outer periphery of the drum for scraping debris collecting on the outer periphery of the drum.

In another embodiment, the device includes a generally horizontally extending cross member located rearwardly of the drum axis and carrying the guard members and means for adjustably mounting the cross member on the frame so that the clearance between the outer periphery of the drum and the inner edges of the guard members can be varied.

In a further embodiment, the device includes a roller assembly supported from the frame rearwardly of the drum axis for further pushing the turf back into place and smoothing down any tufts of grass created by the tines.

A principal feature of the invention is the provision of a turf aerating device including a cylindrical drum mounted for travel over the surface of the turf to be aerated, a plurality of core-forming elements or tines carried on the outer periphery of the drum, and means for minimizing tearing of the turf by the tines as they are withdrawn from the turf.

Another principal feature of the invention is the provision of such an aerating device including means for removing debris collecting on the outer periphery of the drum.

A further principal feature of the invention is the provision of a turf aerating device including a cylindrical drum mounted for travel over the surface of the turf to be aerated, a plurality of core-forming elements or tines carried on the outer periphery of the drum, and means for serving the dual purpose of minimizing tearing of the turf by the tines and removing debris collected on the outer periphery of the drum.

Other features and advantages of the embodiments of the invention will become apparent to those skilled in the art upon reviewing the following detailed description, the drawing and the appended claims.

Figure 1:
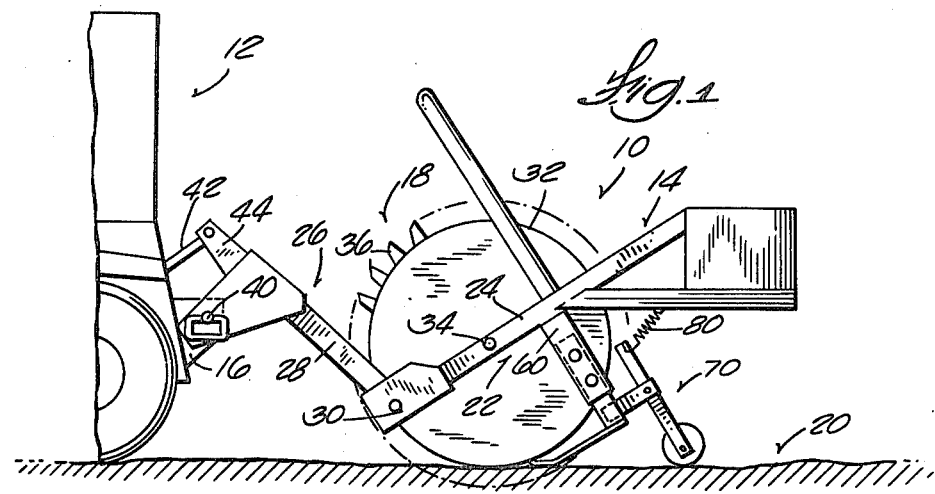
FIG. 1 is a side elevational view of a turf aerating device embodying various of the features of the invention shown hitched to the rear of a vehicle for towing over the surface of a turf to be aerated.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in the drawings is a turf aerating device 10 embodying various of the features of the invention and adapted for connection to a towing vehicle 12 (shown fragmentarily), such as a utility cart of the type commonly used around golf courses and the like.

The turf aerating device 10 includes a frame 14 which is hitched to the vehicle draw bar 16 and rotatably supports a core-forming unit 18 adapted to remove plugs or cores of soil and grass from the turf 20, e.g., a golf fairway, tee or green, as the device is towed over the surface of the turf 20. While various arrangements can be used, in the specific construction illustrated, the frame 14 and the core-forming unit 18 generally are arranged in the manner described in co-pending U.S. application Ser. No. 789,799, filed Apr. 22, 1977 and assigned to the assignee of the present application. The construction and operation of the frame 14 and the core-forming unit 18 will be briefly summarized and reference can be made to the above-identified application for a more detailed description.

The frame 14 includes a rear frame 12 having a pair of laterally spaced side members 24 (one shown) which incline upwardly and rearwardly and a forward frame 26 having a pair of laterally spaced side members 28 (one shown) which incline upwardly and forwardly. The lower or forward end of each of the rear frame side members 24 is pivotally connected at 30 to the lower or rear end of the respective forward frame side members 28 for limited pivotal movement of the rear frame 22 relative to the forward frame 26.

The core-forming unit 18 includes a ground-engageable, hollow, cylindrical drum 32 which is carried on a horizontally extending shaft or axle 34 suitably journaled at the opposite ends in the rear frame side members 24. Carried on the outer periphery of the drum 32 and extending radially outwardly therefrom is a plurality of hollow core-forming elements or tines 36 which are arranged to cut through the grass and thatch, penetrate the sub-soil, and remove a plug or core of grass and soil as the drum 32 is rolled over the turf 20.

Figure 3:
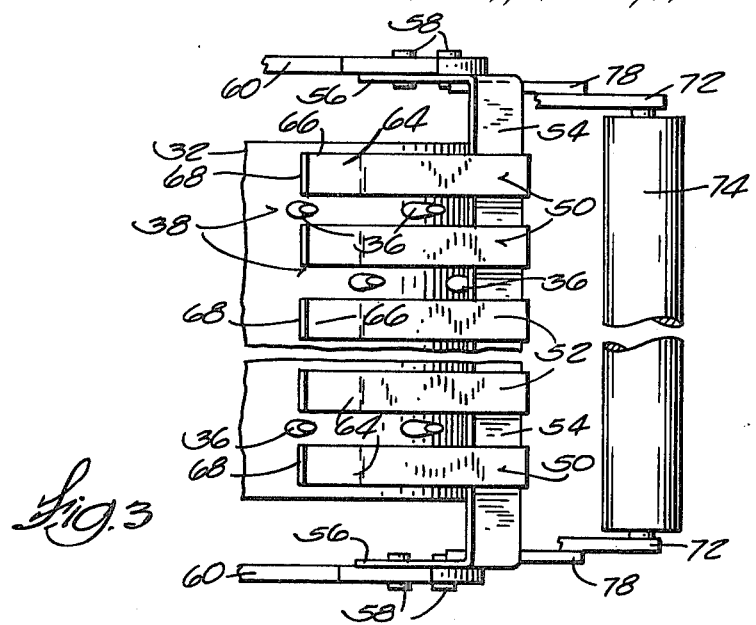
FIG. 3 is a fragmentary view taken generally along line 3—3 in FIG. 2.

As shown in FIG. 3, the tines 36 preferably are arranged in a plurality of laterally spaced, generally parallel rows 38 with the tines in each row being circumferentially spaced at equal intervals, the tines in one row being staggered with respect to the tines in the adjacent rows, and the tines in alternate rows being generally laterally aligned in parallel relationship to the rotational axis of the drum 32. Each of the tines 32 is mounted in registery with a port (not shown) provided in the drum 32 so that the plugs removed from the turf 20 drop into the interior of the drum 32 for later disposal through a closeable trap door (not shown). If desired, the opposite ends of the drum 32 can open, in which case the plugs eventually are discharged from the interior of the drum 32 and disposed over the surface of the turf 20.

The forward portion of the forward frame 26 is pivotally connected at 40 to the vehicle draw bar 16. The forward and rear frames 26 and 22 are selectively moved, by a hydraulically-operated ram 42 connected between the vehicle 12 and an arm 44 on the forward frame 26, between a lowered or aerating position shown in FIGS. 1 and 2 wherein the drum 32 engages the turf 20 and the tines can penetrate the turf and a raised position (not shown) wherein the core-forming unit 18 is completely disengaged from the turf 20.

The tines 26 tend to pull up surrounding turf as they are withdrawn therefrom, particularly when the turf is wet or soggy, resulting in a certain amount of tearing up of the turf 20. This is minimized by providing means for restraining the turf 20 from being pulled upwardly by the tines 36. Such means include a plurality of guard members 50 which are supported from the rear frame 22 rearwardly of the drum axis. Each of the guard members 50 extends toward the outer periphery of the drum 32 to a location laterally adjacent one row 38 of the tines 36 and has a surface which is located to travel closely adjacent the turf surface.

More specifically, the guard members 50 are in the form of an elongated strap and have an outer end portion 52 affixed on a generally horizontally extending cross member 54 located rearwardly of the drum axis. Located on the opposite ends of the cross member 54 are integral mounting arms or brackets 56 which are fastened, such as by bolts 58, to a respective arm 60 extending rearwardly and downwardly from the rear frame side members 24. Each of the arms 60 preferably is provided with slotted openings 62 receiving the mounting bolts 58 so that the guard members 50 can be adjusted forwardly and rearwardly relative to the outer periphery of the drum 32 for purposes explained below.

Figure 2:
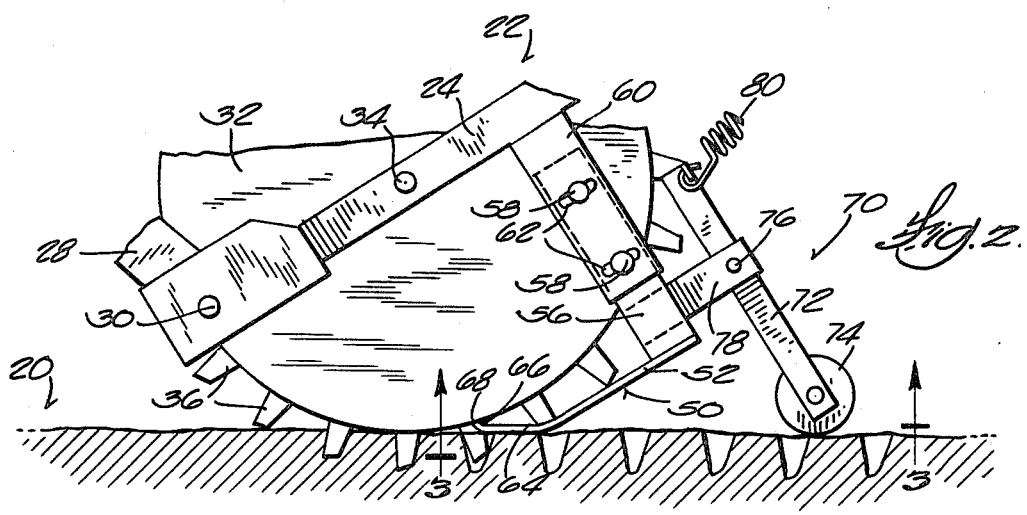
FIG. 2 is an enlarged, fragmentary, side elevation view of the turf aerating device shown in FIG. 1.

As best shown in FIG. 2, each of the guard members 50 include a generally flat intermediate portion 64 extending forwardly from the outer end portion 52 and an inclined inner end portion 66 extending upwardly and forwardly from the intermediate portion 64 toward the outer periphery of the drum 32. The intermediate portion 64 is generally horizontal, with the bottom surface thereof located closely adjacent the turf surface when the core-forming unit 18 is in the lowered or aerating position. Thus, the intermediate portion 64 of the guard members 50 positively restrains the turf 20 from being lifted or pulled upwardly by the tines 36 as the tines are withdrawn from the turf after the penetration.

The portion of the guard member 50 joining the intermediate portion 64 and the inner end portion 66 preferably is curved to enhance camming of displaced turf back into place. The guard members 50 preferably are arranged so that adjacent pairs straddle a row 30 of the tines 36 and thereby provide a positive restraint against tearing of the turf on both sides of each row of tines.

The inner end portion of each guard member 50 terminates in a generally straight edge 68 which, as shown best in FIG. 2, terminates rearwardly of the line of engagement of the drum with the turf or ground, and which, is spaced a small distance from the outer periphery of the drum 32 and serves as a scraper for removing the debris, such as grass, dirt, cores, etc., collected on the outer periphery of the drum 32. This clearance between the edges 60 of the guard members 50 and the outer periphery of the drum 32 can be adjusted to accommodate different conditions by loosening the bolts 58 and moving the cross member 54 either rearwardly or forwardly relative to the drum 32.

Located rearwardly of the drum 32 is a roller assembly 70 which further pushes the turf back into place after aeration and smoothes down any tufts of grass created by the tines 36. The roller assembly 70 includes a pair of laterally spaced brackets 72 which carry a rotatable, groundengagable, cylindrical roller 74 and are pivotally mounted at 76 on respective arms 78 extending rearwardly from the cross arm brackets 56. A spring 80 connected between the upper end of one of the roller assembly brackets 72 and the rear frame 22 biases the roller 74 into engagement with the turf 20. With this arrangement, the roller 74 remains in engagement with the turf 20 while the core-forming unit 18 is traveling over a hill or bump and can pivot relative to the drum 32 while the core-forming unit 18 is traveling down into a valley, thereby minimizing the tendency of the roller 74 to lift the drum 32 out of engagement with the turf 20.

Various of the features of the invention are set forth in the following claims:

What is claimed is:

1. A turf aerating device comprising a frame, a cylindrical drum supported from said frame for rotation about a horizontally extending axis and for rolling travel over the surface of the turf to be aerated, a plurality of radially extending, core-forming elements carried on the outer periphery of said drum and adapted to penetrate the turf, said core-forming elements being arranged in a plurality of laterally spaced, generally parallel rows, and a plurality of guard members mounted on said frame rearwardly of said drum axis, each of said guard members extending toward the periphery of said drum to a location laterally adjacent one of said rows, having a surface which is located to travel closely adjacent the turf surface and thereby restrain the turf from being pulled upwardly by said core-forming elements, and terminating rearwardly of the line of engagement of said drum with the turf surface.

2. A turf aerating device according to claim 1 wherein each of said guard members comprises an elongated strap having an rearward end portion affixed on said frame, a generally flat intermediate portion extending forwardly from said rearward end portion, and an forward end portion extending upwardly and forwardly from said intermediate portion toward the periphery of said drum.

3. A turf aerating device according to claim 2 wherein adjacent pairs of said guard members are arranged to straddle one of said rows.

4. A turf aerating device according to claim 1 including a ground-engagable roller supported from said frame rearwardly of the drum axis.

5. A turf aerating device comprising a frame, a cylindrical drum supported from said frame for rotation about a horizontally extending axis and for rolling travel over the surface of the turf to be aerated, a plurality of radially extending, core-forming elements carried on the outer periphery of said drum and adapted to penetrate the turf, said core-forming elements being arranged in a plurality of laterally spaced, generally parallel rows, and a plurality of guard members mounted on said frame rearwardly of said drum axis, each of said guard members extending toward the periphery of said drum to a location laterally adjacent one of said rows, having a surface which is located to travel closely adjacent the turf surface and thereby restrain the turf from being pulled upwardly by said core-forming elements, and terminating in an inner edge closely spaced from the outer periphery of said drum for scraping off debris collecting on the outer periphery of said drum.

6. A turf aerating device according to claim 5 including a generally horizontally extending cross member located rearwardly of the drum axis and carrying said guard members, and means for adjustably mounting said cross member on said frame.

7. A turf aerating device according to claim 5 wherein each of said guard members comprises an elongated strap having a rearward end portion affixed on said frame, a generally flat intermediate portion extending forwardly from said rearward end portion, and a forward end portion, including said inner edge, extending upwardly and forwardly from said intermediate portion toward the periphery of said drum.

8. A turf aerating device comprising a frame, a cylindrical drum supported from said frame for rotation about a horizontally extending axis and for rolling travel over the surface of the turf to be aerated, a plurality of radially extending, core-forming elements carried on the outer periphery of said drum and adapted to penetrate the turf, said core-forming elements being arranged in a plurality of laterally spaced, generally parallel rows, a generally horizontally extending cross member mounted on said frame rearwardly of the drum axis, bracket means pivotally supported from said cross member, a ground-engageable roller supported from said bracket means rearwardly of the drum axis, and spring means connected between said bracket means and said frame for biasing said roller into engagement with the turf, and a plurality of guard members mounted on said cross member, each of said guard members extending toward the periphery of said drum to a location laterally adjacent one of said rows and having a surface which is located to travel closely adjacent the turf surface and thereby restrain the turf from being pulled upwardly by said core-forming elements.

9. A turf aerating device according to claim 8 wherein each of said guard members comprises an elongated strap having a rearward end portion affixed on said cross member, a generally flat intermediate portion extending forwardly from said rearward end portion, and a forward end portion extending upwardly and forwardly from said intermediate portion toward the periphery of said drum.

* * * * *